(12) United States Patent
Urs (10) Patent No.: US 6,878,771 B2
(45) Date of Patent: Apr. 12, 2005

(54) MATTE-FINISH POLYURETHANE COATING COMPOSITION

(76) Inventor: Bhaskar R. Urs, 8720 E. Via Del Sol, Scottsdale, AZ (US) 85255

( * ) Notice: Subject to any disclaimer, the term of this patent is extended or adjusted under 35 U.S.C. 154(b) by 192 days.

(21) Appl. No.: 10/260,886

(22) Filed: Sep. 30, 2002

(65) Prior Publication Data

US 2004/0063844 A1 Apr. 1, 2004

(51) Int. Cl.⁷ .............................. C08J 3/00; C08K 3/20; C08K 3/34; C08L 75/00
(52) U.S. Cl. ....................... 524/590; 524/401; 524/492; 524/493; 524/589
(58) Field of Search ................................ 524/401, 492, 524/493, 589, 590

(56) References Cited

U.S. PATENT DOCUMENTS

| | | |
|---|---|---|
| 3,917,556 A | 11/1975 | Baurecht et al. |
| 4,049,610 A | 9/1977 | Bunge et al. |
| 4,075,152 A | 2/1978 | Taller |
| 4,129,455 A | 12/1978 | Thompson et al. |
| 4,143,181 A | 3/1979 | Cahn et al. |
| 4,181,491 A | 1/1980 | Hovis |
| 4,304,706 A | 12/1981 | Urs |
| 4,523,003 A | 6/1985 | Bezwada |
| 5,128,423 A | 7/1992 | Parrinello et al. |
| 5,221,337 A * | 6/1993 | Luers et al. ............ 106/266 |
| 5,506,328 A | 4/1996 | Chandalia et al. |
| 5,998,532 A | 12/1999 | Urs |

FOREIGN PATENT DOCUMENTS

WO   WO 97/16467   5/1997

OTHER PUBLICATIONS

M.J. Dvorchek, et al., "Aldimine–Isocyanate Chemistry: application in High Solids Coatings," Waterborne, Higher–Solids, and Powder Coatings Symposium, Feb. 22–24, 1995, pp. 78–87.

S.M. Lee, et al., "Aklimine–Isocyanate Chemistry: A Foundation for High Solids Coatings," Waterborne, Higher–Solids, and Powder Coatings Symposium, Feb. 22–24, 1995, pp. 69–77.

Wicks, et al., "Amine Chemistries for Isocyanate–Based Coatings," Progress in Organic Coatings, (1997) vol. 30, pp. 265–270.

* cited by examiner

Primary Examiner—Patrick D. Niland
(74) Attorney, Agent, or Firm—Jansson, Shupe & Munger, Ltd.

(57) ABSTRACT

The invention relates to a color pigmented moisture-curing polyurethane coating that cures to form a film having a matte finish, as well as methods of producing the coating. The coating is suitable for use as a protective and/or decorative coating. The coating comprises one or more specified color pigments, polyisocyanates, polyols, tertiary amines, and a matting agent or agents. The combination of constituents provide a finished form coating with highly controlled gloss and sheen characteristics. Additional optional ingredients may be added to the coating composition, including catalysts, ultraviolet light stabilizers, wetting agents, solvents, and agents to increase slip and flow.

31 Claims, 2 Drawing Sheets

MATTE-FINISH POLYURETHANE COATING COMPOSITION

FIELD OF THE INVENTION

This invention is related generally to coating compositions and, more specifically, to polyurethane coating compositions which cure to form a coating having controlled light reflectance.

BACKGROUND OF THE INVENTION

Polyurethane coatings are known in the industry as some of the toughest and most useful coatings available. Polyurethane coatings are versatile and have wide-ranging applications as commercial and industrial protective coatings as well as for use as decorative coatings on walls, floors and other surfaces.

Moisture-curing polyurethane coatings are a highly desirable group of such polyurethane coatings. Moisture-curing polyurethane coatings advantageously can be produced without the use of heat or other external sources of energy being applied. Such coatings are very useful, for example, as paints provided to coat buildings and equipment that cannot be heated. Typical applications for such paints could include painting of prefabricated metal buildings, machinery, aircraft, vehicles, ships, etc. The tough film formed by the cured polyurethane coating forms a barrier resisting corrosion and damage to the coated surface. Such moisture-curing polyurethane coatings comprise extended polyols combined with polyisocyanates that react with atmospheric water at room temperatures to cure and form useful films. These coating compositions may be pigmented as desired and additives (such as catalysts) may be incorporated to control composition properties, such as the time required for curing of the coating. Moisture-curing polyurethane coatings are typically available in single component and two component systems. Examples of such moisture-curing polyurethane coatings are taught in my U.S. Pat. Nos. 4,304,706 (Urs) and 5,998,532 (Urs) each of which is incorporated herein by reference.

In certain applications it is essential to closely control the reflectance of light from the surface of the cured film formed by the moisture-curing polyurethane coating. One such application involves the use of moisture-curing polyurethane coatings as paints for use on civilian and military vehicles and equipment. Such vehicles and equipment are often painted in muted colors so as to blend in with the surroundings in which the vehicles and equipment are intended for use. For example, paints with earth-tone colors are often applied to automobiles, utility vehicles and trucks to enable those vehicles to better blend in with the vegetation and terrain in which the vehicle is to be used. By way of further example, paints with grey and blue color tones are often used to coat the hull and exterior surfaces of military water craft to permit such vessels to more closely resemble the water and horizon. Moisture-curing polyurethane coatings may also be formulated specifically as camouflage paints provided for the express purpose of making the vehicles and equipment more difficult to detect under visual and infra-red conditions.

In these and other applications, polyurethane coatings are required to have very low light reflectance properties such that the coating scatters essentially all incident light. For example, the United States military has implemented military specifications MIL-C-53039 and MIL-C-46168 which, respectively, set requirements for light reflectance and other physical properties for two component and single component moisture-curing polyurethane coating systems. Both of the aforementioned specifications require that the film formed by the cured coating have a gloss value of less than 1 measured using a glossmeter at an angle of 60° to the coated surface. The specifications further require that such film have a sheen value of less than 3.5 measured using a glossmeter at an angle of 85° to the coated surface. As is known to persons of skill in the art, these gloss and sheen properties define a coating with a pronounced matte finish and an appearance which is flat with highly limited light reflectance.

Matting agents are typically added to moisture-curing polyurethane coatings in order to obtain the desired low levels of gloss and sheen. However, selection of a matting agent must be made carefully because the matting agent has a material effect on both the cost of the coating as well as on the physical properties of the coating. Typical matting agents may include, by way of example, polymeric organic particles or crystalline silica. Polymeric organic particles are disadvantageous, however, because the particles are unduly expensive and can vary in physical properties from lot to lot making it difficult to formulate consistent batches of paints or coatings. Crystalline silica is a matting agent manufactured by calcining deposits of diatoms to produce a very fine powder which is effective at scattering light when used in a coating composition. Crystalline silica is disadvantageous, however, because special equipment is required to avoid contact between people involved in the manufacturing process and the crystalline silica powder. It is expected that crystalline silica will be phased out for use as a matting agent in future military coating specifications due to these use-related inefficiencies associated with the material. A substitute for crystalline silica is required.

Polyurethane coatings including other conventional flattening or matting agents, such as talc, mica, calcium carbonate, aluminum silicate and non-crystalline synthetic silica, have demonstrated reduced levels of gloss and sheen. However, the quantities of matting agents required to reduce the gloss and sheen to within the abovementioned military coating specifications are large enough so as not to be practical. The amount of matting agent incorporated into a polyurethane coating must be selected so that the agent will not exceed the critical pigment volume concentration (CPVC). Exceeding the CPVC is disadvantageous because the resultant composition will have decreased flow properties while the cured film will undesirably have decreased film flexibility (impairing formulation and application of the coating) and increased film porosity rendering the cured film more brittle and susceptible to degradation.

A further issue confronting formulators of moisture-curing polyurethane coatings is the need to provide additives which reduce the time and expense of manufacturing the coating compositions. Such additives may be used, for example, to accelerate the various reactions or reduce the temperature conditions required for such reactions to occur. Metal-based catalysts commonly used in the industry are useful in imparting these properties to the coating compositions. However, such catalysts have side effects which are detrimental to the properties of the finished coating composition. For example, use of metal-based catalysts to accelerate the reaction of the polyurethane coating and atmospheric moisture reaction is known to increase the gloss of the finished form film.

There remains a need for a pigmented moisture-curing polyurethane coating which will include all of the performance benefits of existing coatings yet provide a film, following curing, with highly controlled light reflectance properties and which may include additives permitting controlled manufacture and application of the coating compositions in ways which are easy, efficient and inexpensive.

OBJECTS OF THE INVENTION

It is an object of the invention to provide an improved moisture-curing polyurethane coating overcoming some of the problems and shortcomings of the prior art, including those referred to above.

Another object of the invention is to provide an improved moisture-curing polyurethane coating which, following curing, provides a film with highly controlled gloss and sheen properties.

A further object of the invention is to provide an improved moisture-curing polyurethane coating which, following curing, has a matte finish.

An object of the invention is to provide an improved moisture-curing polyurethane coating which, following curing, scatters light applied to the coating.

Yet another object of the invention is to provide a method for efficiently and inexpensively manufacturing an improved moisture-curing polyurethane coatings.

Another object of this invention is to provide an improved moisture-curing polyurethane coating in which a color pigmented dispersion is provided that will reduce the monomeric isocyanate content of the composition.

One object of this invention is to provide an improved moisture-curing polyurethane coating which can be manufactured using conventional high yield paint manufacturing equipment.

A further object of this invention is to provide an improved moisture-curing polyurethane coating in which a color pigmented dispersion is provided that will easily convert commercially available isocyanate prepolymers into pigmented moisture-curing polyurethanes.

It is a further object of this invention to provide an improved moisture-curing polyurethane coating which has a low viscosity thereby facilitating application of the coating to the surface to be coated.

It is still a further object of this invention to provide an improved moisture-curing polyurethane coating which is safer to use.

How these and other objects are accomplished will become apparent from the following descriptions and the drawings.

SUMMARY OF THE INVENTION

The invention is a color pigmented moisture-curing polyurethane coating composition and a method of making the composition. The composition reacts with atmospheric moisture to cure and form a film with a matte finish having closely controlled low levels of light reflectance. Compositions made according to the invention produce a cured film advantageously having a gloss (taken at an angle of 60°) of less than about 1 and a sheen (taken at an angle of 85°) of less than about 3.5. The components responsible for the matte finish appearance of the cured film are acceptable for commercial and military use and provide improved product consistency and reduced product costs. The coating composition has a low viscosity such that the composition is flowable making the composition ideal for use as a paint for application to military vehicles, marine vessels, machinery and other surfaces where very low levels of gloss and sheen are desired.

In general, the composition comprises about 50–85 percent by weight of: (1) a pigmented dispersion admixed with; (2) about 15–50 percent by weight of an isocyanate prepolymer component. (Unless otherwise indicated, all weight percentages provided herein are based on the weight percentage of the total coating composition.) The pigmented dispersion is preferably the reaction product of an admixture of: (1) about 47–60 percent by weight of a pigmented slurry and about 0.5–3.0 percent by weight of a polyisocyanate admixed with; (2) about 2.0–20.0 percent by weight of an organic hydrogen donor, preferably a polyol component, yielding a urethane polyol reaction product having an excess of unreacted hydroxyl groups. The pigmented dispersion results from mechanical dispersion of these components. The isocyanate prepolymer is added to the pigmented dispersion and reacts with the hydroxyl groups to extend the molecular weight of the urethane polyols and yield the finished form coating composition. Sufficient isocyanate is provided to maintain a viscosity sufficient to ensure that the coating composition is flowable.

The pigmented slurry component of the pigmented dispersion preferably comprises an admixture of about 10–40 percent by weight of at least one water-containing pigment, about 3–20 percent by weight of synthetic silica provided as a matting agent component and about 10–40 percent by weight of a solvent provided for dispersion of the pigmented slurry components. About 0.1–3.0 percent by weight of at least one tertiary amine catalyst is preferably provided as a component of the pigmented slurry.

The synthetic silica matting agent and tertiary amine catalyst are required to produce the desired low levels of gloss and sheen in the cured film of the finished coating. It is thought that these components, in combination with polyurea produced in a "dehydration" reaction described below, are responsible for the controlled light reflectance properties of the cured film. The most highly preferred synthetic silica comprises an amorphous silica made according to the "sol gel" process known to those of skill in the art. The maximum particle size diameter of such silica is about 100$\mu$. Synthetic silica is advantageous as a matting agent component because the unit cost of this material is less than that of polymeric organic particles. The consistency of synthetic silica is high from batch to batch and synthetic silica is expected to remain an approved material under MIL-C-53039 and MIL-C-46168. Synthetic silica in the present application is an efficacious replacement for crystalline silica.

Other optional constituents may be provided as additional matting agents components. These constituents may include mica, talc, calcium carbonate and clays. If provided, these optional constituents may comprise about 5–50 percent by weight of the total composition. These optional constituents are typically provided as "fillers" because they cost less than synthetic silica. A preferred type of optional mica comprises wet-ground mica having a maximum particle size diameter of about 100$\mu$.

Highly preferred tertiary amine catalysts include triethyl amine, N,N,N',N',N"-pentamethyldiethylenetriamine, and N,N,N',N'-tetramethyl-1,3-propanediamine and mixtures thereof.

The reaction of the pigmented slurry and polyisocyanate may be characterized as a "dehydration" reaction. In such reaction, the polyisocyanate reacts with water in the pigmented slurry (typically in the pigment component) in the presence of the tertiary amine catalyst to essentially eliminate such water. The amount of polyisocyanate admixed with the pigmented slurry is selected so that the polyisocyanate component is in excess of the amount required to fully dehydrate the slurry. Polyurea is a byproduct of this reaction.

Preferably, the polyisocyanate selected for use in the dehydration reaction is an aliphatic diisocyantate. Preferred aliphatic diisocyanates are selected from the group consisting of isophorone diisocyanate, trimethyl hexamethylene diisocyanate, hexamethylene diisocyanate, toluene diisocyanate and diphenyl methane diisocyanate.

Addition of the preferred polyol hydrogen donor constituent to the pigmented slurry and excess isocyanate results in an "extension" reaction with the excess polyisocyanate wherein the preferred polyol and polyisocyanate react in the presence of the tertiary amine catalyst to form a pigmented paste including a reaction product comprising extended urethane polyols having unreacted hydroxyl groups. The paste is agitated, preferably by mechanical dispersion to form the pigmented dispersion.

The preferred hydrogen donors are polyols. Highly preferred polyols include polycaprolactone polyols, polytetramethylene ether glycols, polypropylene glycols, polyester diols, alkylene diols, 1,4 cyclohexane dimethanol and polycarbonates having terminal hydroxyl groups and having an average functionality of less than 2.3.

In a final step of the preferred process, the isocyanate prepolymer is admixed with the pigmented dispersion including the urethane polyol reaction product. In the presence of the tertiary amine catalyst, the isocyanate prepolymer reacts with and consumes all of the hydroxyl groups of the urethane polyol reaction product of the pigmented dispersion to further extend the molecular weight of the urethane polyol reaction product to yield the finished form coating composition.

The isocyanate prepolymer is provided in an amount calculated to produce an excess of isocyanate groups in the finished composition. Such excess isocyanate groups react with atmospheric moisture to cure the composition to form the desired film once the coating has been applied to a surface to be coated. The amount of the isocyanate prepolymer is further selected so that the composition is flowable and has a low viscosity.

The isocyanate prepolymer which is admixed with the pigmented dispersion to form the finished form composition preferably comprises an organic isocyanate. The most highly preferred isocyanates include biuret of hexamethylene diisocyanate, dimers, trimers and oligomers of hexamethylene diisocyanate, isophorone diisocyanate, trimethyl hexamethylene diisocyanate, toluene diisocyanate and diphenyl methane diisocyanate.

Solvents may be included in the composition as an aid in formulation and material flow. Many solvents are suitable for use with the invention. Suitable solvents include methyl amyl ketone, xylene, parachlorobenzotrifluoride (PCBFT) and mixtures thereof. Other solvents may include ketones, esters, aromatic hydrocarbons and mixtures thereof.

Other optional additives may be provided before or after formulation of the finished form coating composition. One or more ultraviolet light stabilizers, wetting agents, and agents to increase slip and flow may be added during or after formulation of the composition. Tertiary amine catalysts as described above or other catalysts may optionally be added following formulation of the coating composition, particularly to control the rate at which the finished form polyurethane coating reacts with atmospheric moisture to cure following application to the surface to be coated.

DETAILED DESCRIPTION OF PREFERRED EMBODIMENTS

The moisture-curing polyurethane coating which cures to form a film having a matte finish will now be described in detail with respect to the drawings, examples and information provided below. The preferred embodiments described herein are not intended to be exhaustive or to limit the invention to the precise form disclosed.

In the preferred embodiment, the invention comprises about 50–85 percent by weight of the total composition of a pigmented dispersion admixed with about 15–50 percent by weight of the total composition of a second isocyanate prepolymer. Each of these components will now be described in detail.

The preferred pigmented dispersion of the invention will be described first. The pigmented dispersion comprises an admixture of: (1) about 47–60 percent by weight of the total composition of a pigmented slurry and about 0.5–3.0 percent by weight of the total composition of a polyisocyanate admixed with; (2) about 2.0–20 percent by weight of the total composition of an organic hydrogen donor, preferably an organic polyol component.

The pigmented slurry includes selected pigments and further includes certain of the constituents at least partially responsible for the matte finish of the cured film. Preferably, the pigment or pigments comprise 10–40 percent by weight of the total composition. The pigments may consist of one or more colored pigments well known to those of ordinary skill in the art. Such pigments are generally metal oxides. Preferred pigments include, but are not limited to, titanium dioxide, iron oxides, organic complexes, mica, talc and quartz. One pigment may be used, or a combination of two or more pigments may be utilized. Different colors can be obtained by choosing proper pigments and combining them in appropriate fashion with the necessary adjustments, common in the paint industry, being made. The pigments typically include water.

Synthetic silica is provided in the pigmented slurry as a matting agent component. Preferably, 3–20 percent by weight of the composition comprises synthetic silica. The synthetic silica preferably comprises an amorphous silica made according to the "sol gel" process well known to those of skill in the art. The maximum particle size diameter of the synthetic silica, determined on a weight basis, is about 100µ. Synthetic silica is used in place of crystalline silicas typical of conventional polyurethane coatings. The synthetic silicas may be used in low enough amounts so as to be below the critical pigment volume concentration (CPVC) of the composition thereby avoiding any detrimental effect on flow properties typical of many known matting agents. In addition, the synthetic silicas are compliant with government standards and are not expected to be phased out in the future as is the case with crystalline silicas.

Mica, talc, calcium carbonate, clays and the like may be provided as optional "fillers" useful as optional matting agent constituents. A preferred mica is a wet-ground mica with a maximum particle size diameter of about 100μ. If provided, these optional constituents may comprise about 5–50 percent by weight of the total composition. Such optional constituents typically cost less than synthetic silica and advantageously reduce the cost of the composition.

The pigmented slurry is then "dehydrated" by reaction with an excess of a polyisocyanate so that any water in the pigment or other slurry constituents is eliminated. The polyisocyanate dehydrates and removes essentially all water from the pigmented slurry. A calculated excess of the polyisocyanate is provided to ensure that all of the water is eliminated. Polyurea is formed as a byproduct of the dehydration reaction.

About 0.1–2.0 percent by weight of a tertiary amine catalyst is provided to accelerate this dehydration reaction. The tertiary amine catalyst is preferably a component of the pigmented slurry but may be added following preparation of the pigmented slurry.

The preferred polyol hydrogen donor component is then added in an "extension" reaction. The resultant reaction of the excess polyisocyanate and polyol in the presence of the tertiary amine catalyst generates a pigmented dispersion paste including long chain polyols cross linked to a urethane backbone (also referred to herein as urethane polyols). The long chain polyols exhibit excess hydroxyl groups provided to react with the isocyanate prepolymer as described in more detail below.

The pigmented paste is agitated to form the pigmented dispersion containing pigment, one or more matting agents, polyurea and urethane polyols. The isocyanate prepolymer reacts with the urethane polyols present in the pigmented dispersion to further increase the molecular weight of the urethane polyols and form the pigmented moisture-curing polyurethane coating composition. The reaction is catalyzed by the tertiary amine catalyst present in the pigmented dispersion.

Without wishing to be bound by any particular theory, it is thought that the polyurea, synthetic silica and tertiary amine catalyst are responsible for the matte appearance of the cured film. It is thought that a unique polyurea is formed as a byproduct of the tertiary-amine catalyzed polyisocyanate and water dehydration reaction and it is further thought that such polyurea is not consumed during the subsequent reactions. The unique polyurea is thought to coat the silica, or otherwise interact with the silica to yield a cured film which is highly effective in scattering incident light and has a matte appearance. As demonstrated below, the controlled light reflectance of the cured coating was not observed without the presence of the tertiary amine catalyst. Polyurea formed in the presence of a metal catalyst would not be expected to yield a cured film with a matte finish. In fact, use of a metallic catalyst would be expected to yield a cured film outside the range permitted under MIL-C-53039 and MIL-C-46168. The combination of these constituents surprisingly and unexpectedly results in a moisture-curing polyurethane coating which cures to form a film with the desired controlled light reflectance properties.

The pigment or pigments will be selected based on the desired application for the finished form coating composition. The pigments may be blended as required to produce the desired color. Pigments used to formulate a representative "camouflage green #383" coating include carbazole violet (Bayer Corp., Pittsburgh, Pa.), mapico tan 20 (Rockwood Pigments, Beltsville, Md.), cobalt V-12600 (Ferro Corporation, Cleveland, Ohio) and chromium oxide G8599 (Elementis Pigments, Corpus Christie, Tex.).

Preferred micas include CD-2200 mica available from Georgia Industrial Minerals of Sandersville, Ga. A preferred synthetic silica is Gacil HP39 available from INEOS Silicas of Joliet, Ill.

The preferred polyisocyanates for use as the polyisocyanate component are aliphatic diisocyanates. Preferred organic diisocyanates include, but are not limited to: isophorone diisocyanate (IPDI); trimethyl hexamethylene diisocyanate (TMDI); toluene diisocyanate; and diphenyl methane diisocyanate (MDI). TMDI is excellent for flexible coatings and for exterior use. Toluene diisocyanate is low priced but exhibits poor durability characteristics when used on exterior applications. MDI has poor exterior durability but forms a tough chemical-resistant coating.

Polyols, are well known in the art and are readily available in the market place. Useful polyols include, but are not limited to: TONE-0210 (Union Carbide Corporation, Lisle, Ill.), a polycaprolactone; polymeg, polytetramethylene ether glycols; polypropylene glycols, low priced polyethers; Desmophen 1700 (Bayer Corporation, Pittsburgh, Pa.), a polyester diol; 1,4-butanediol, a short chain alkylene diol such as used in conjunction with other long chain diols to produce tough and abrasion resistant coatings; and 1,4 cyclohexane dimethanol (Eastman Chemicals, Kingsport, Tenn.).

The isocyanate prepolymer which is admixed with the pigmented dispersion may comprise polyisocyanates (which are basic raw materials in the manufacture of moisture-curing polyurethanes) having very low monomer contents. Preferred polyisocyanates include, but are not limited to, Desmodur-75 (Bayer Corporation, Pittsburgh, Pa.) (generically biuret of hexamethylene diisocyanate); Mondur CB-75 (Bayer Corporation, Pittsburgh, Pa.); Mondur T-1890; Talonate HDT-LV (Rhodia, Inc., Cranbury, N.J.) and Luxate HD-100 (Arco Chemicals, Newtown Square, Pa.). There are several other polyisocyanates commercially available that come under similar classification. It is desirable to manufacture pigmented moisture-curing polyurethanes using these preferred polyisocyanates for the following reasons: (1) they offer the lowest possible monomer contents; and (2) they are of the lowest possible viscosities and hence require less solvent reducing the cost in the final product.

Numerous tertiary amines may be utilized in the present invention. Preferably the tertiary amine catalyst comprises 0.1–3.0 percent by weight of the total composition. A single tertiary amine may be used, or a combination of two or more may be added as catalysts. Preferred tertiary amines include, but are not limited to: Desmorapid PP (Bayer Corp, Pittsburgh, Pa.); triethyl amine (Aldrich, Milwaukee, Wis.); N,N,N',N',N"-pentamethyldiethylenetriamine (Aldrich, Milwaukee, Wis.); and N,N,N', N'-tetramethyl-1,3-propanediamine (Aldrich, Milwaukee, Wis.).

A tertiary amine catalyst such as those listed above may also be added to the finished form composition after formulation but prior to application of the coating to the surface to be coated. The purpose of adding such tertiary amine catalyst is to adjust the rate at which the composition reacts with atmospheric moisture to cure to form the finished form film. The tertiary amine catalyst added to the finished form composition may comprise less than 3.0 percent by weight of the total composition.

Other optional constituents may be included in the coating composition. One or more solvents may be included, if necessary, to assist in processing the composition and as a solubility aid. The solvent, if present, will preferably be present in an amount of about 10–40 percent by weight of the total coating. The lowest possible quantities of solvents required for forming the coating should be utilized for reasons of economy and environment protection. Suitable solvents include, but are not limited to: ketones such as methyl isobutyl ketone and methyl amyl ketone; butyl acetate; xylene and PCBTF.

Other additives well known in the paint processing art may also be included as desired. These additives include, but are not limited to: ultraviolet light stabilizers, wetting agents, and agents to increase slip and flow. One such flow agent is Byk-300 (Byk Chemie USA, Hartford, Conn.). By way of example only, a thixotrope such as Disperbyk 167 (Byk Chemie USA, Hartford, Conn.) may be included as an optional additive. Other thixotropes may include modified bentonites, fumed silicas, modified polyethylene and polyamides. By way of further example, a dispersing agent such as Bentone 27 (Elementis Specialties, Corpus Christie, Tex.) may be provided. The dispersing agent may be selected from the group consisting of cationic, anionic and nonionic dispersing agents and mixtures thereof Typically, each optional additive is provided in an amount of between about 0.1–5 weight percent of the total composition.

The preferred embodiment illustrated in FIGS. 1 through 4 and as described herein is not intended to be exhaustive or to limit the invention to the precise form disclosed. The illustrative embodiment is chosen and described in order to best explain the principles of the invention and its application and practical use to thereby enable others skilled in the art to best utilize the invention.

Figure 1:
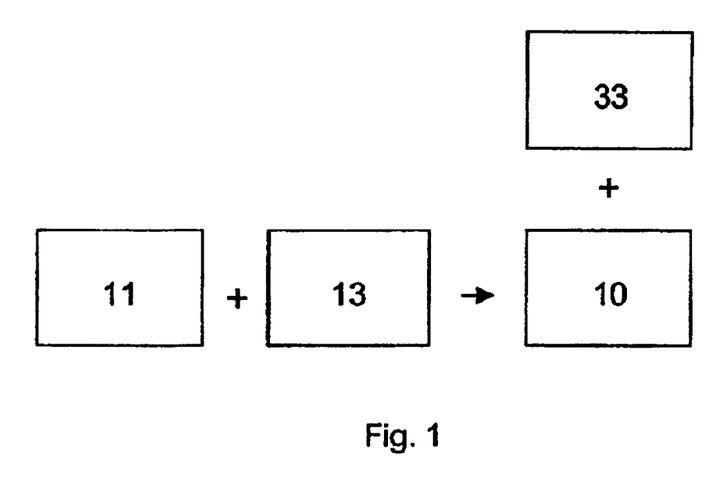
FIG. 1 illustrates, by means of a block diagram, a method for manufacturing a moisture-curing polyurethane coating which cures to form a film having a matte finish in accordance with the present invention.

Referring first to FIG. 1, the coating composition 10 of the invention cures to form a film with controlled levels of gloss and sheen. The film has a gloss value of 1 or less and a sheen value of 3.5 or less. In general, the coating composition 10 is comprised of an admixture of a pigmented dispersion 11 and an isocyanate prepolymer 13.

Figure 2:
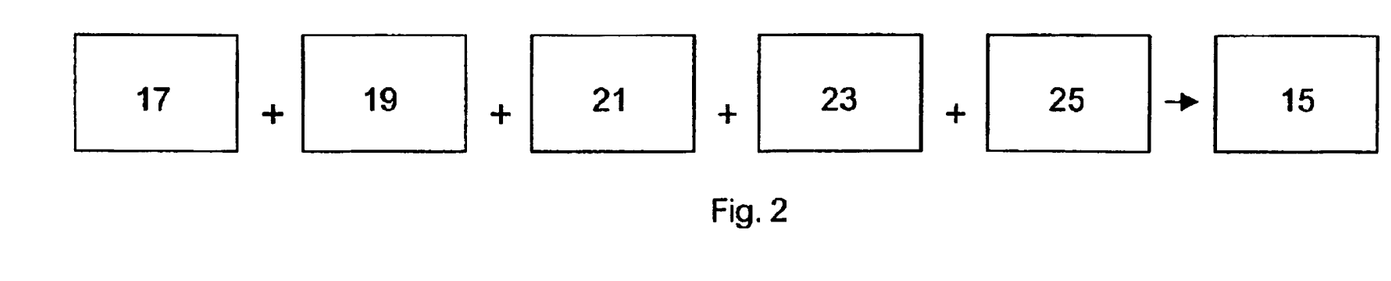
FIG. 2 illustrates, by means of a block diagram, a method for yielding a pigmented slurry including constituents for producing a matte finish in the cured film in accordance with the present invention.

The pigmented dispersion 11 comprises, in part, a pigmented slurry 15. As shown in FIG. 2, the pigmented slurry 15 is comprised of a colored pigment component 17, an optional solvent component 19, a synthetic silica matting agent component 21 and a tertiary amine catalyst component 23. Optional additives 25 discussed below may also be included in pigmented slurry 15. One or more pigments, solvents, matting agents and tertiary amine catalysts may make up respective components 17, 19, 21, 23 and 25.

Components 17, 19, 21, 23 and 25 are combined in a jacketed tank well known in the art and commonly used in the making of paints and other types of protective coatings. While synthetic silica is a required matting agent component 21, other additives or "fillers", such as mica, talc, calcium carbonate and clays may be included as a matting agent component 21. The components of the slurry 15 are added to the tank in no particular order. The tertiary amine catalyst 23 is not required for formulation of the pigmented slurry 15 and is shown as a constituent of the pigmented slurry 15 solely for convenience as the tertiary amine catalyst may be added at any time before the dehydration reaction.

The materials comprising the colored pigment 17, solvent 19 and optional additive components 25 provided for use in the slurry 15 are well known in the art and are readily available in the market. Although the additives 25 are well known in the art, special attention must be paid to their compatibility and/or reactivity with the isocyanate prepolymer 13. Examples of additives 25 include ultraviolet light stabilizers, wetting agents, thixotropes and agents to increase slip and flow.

The slurry 15 is agitated to form a homogenous mixture after which a small sample is withdrawn to test its moisture content by means of the Karl-Fischer titration test, well known in the art, or by other methods well known in the art. The moisture or water is contained in the admixture of the pigment 17, solvent 19 and additive 25 components. The amount of water present in the slurry 15 is calculated from the results of the test sample.

Figure 3:
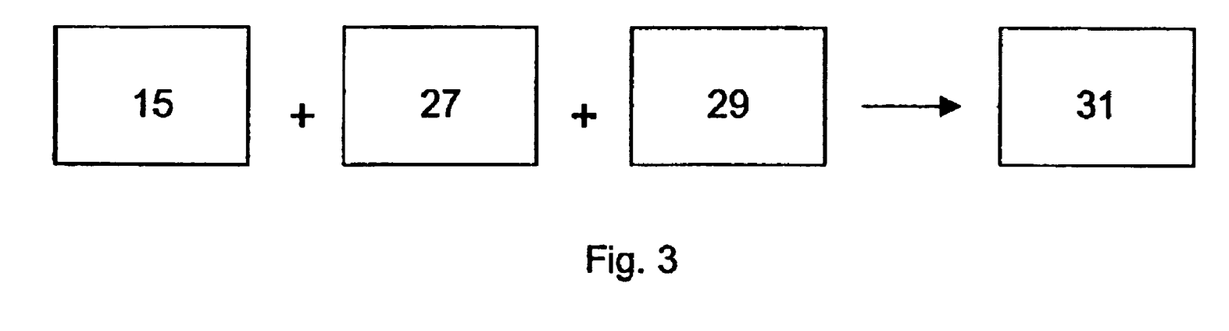
FIG. 3 illustrates, by means of a block diagram, a method for yielding a pigmented paste in accordance with the present invention.

Referring to FIG. 3, a polyisocyanate component 27 preferably comprising monomeric diisocyanate is calculated to completely consume the water present in the pigmented slurry 15. Monomeric diisocyanate is well known for its moisture eliminating qualities. For example, twelve and one third (12.33) parts by weight of the monomeric diisocyanate IPDI will consume one (1) part by weight of water of the pigmented slurry 15. Therefore, based on the amount of water found by means of the Karl-Fischer titration test, the amount of IPDI needed to dehydrate the water in the pigmented slurry 15 can be calculated. If any other additives are used that bring with them other materials that react with isocyanates then additional IPDI may have to be used for complete dehydration of the pigmented slurry 15. The monomeric diisocyanate comprising the polyisocyanate component 27 is added to the pigmented slurry 15 separately or with the tertiary amine catalyst 23 if the catlyst 23 is not already present in the pigmented slurry 15. The tertiary amine catalyst 23 drives the dehydration reaction between the slurry 15 and the monomeric diisocyanate provided as component 27.

An additional amount of the monomeric diisocyanate of component 27 is added to the slurry 15 resulting in an excess of the monomeric diisocyanate. The additional amount of monomeric diisocyanate is selected based on the nature of the hydrogen donor component 29 that will be added when the pigmented dispersion 11 and isocyanate prepolymer 13 are admixed later in the process.

Polyurea is a by-product of the dehydration reaction of the pigmented slurry 15 and polyisocyanate component 27. The polyurea is not consumed in the subsequent steps and is present in the pigmented dispersion 11 and finished form coating composition 10. As discussed herein, the polyurea generated in the dehydration reaction is thought to be at least partially responsible for the matte finish of the cured film.

The pigmented slurry 15, tertiary amine 23 and the preferred monomeric diisocyanate comprising component 27 are continuously agitated at between about 150–160° F. until the water-isocyanate dehydration reaction is complete or has reached the desired level; that is, elimination of the water (i.e, dehydration) from the pigmented slurry 15 is complete. When the isocyanate-water reaction is complete, an amine titration test, well known in the art, may be used to confirm the amount of excess monomeric diisocyanate of component 27 remaining in the pigmented slurry 15.

Referring further to FIG. 3, component 29, preferably comprising a polyol hydrogen donor, is added to the admixture of the pigmented slurry 15, tertiary amine 23 and excess monomeric diisocyanate of component 27. The admixture is agitated until the excess monomeric diisocyanate of component 27 is consumed by the polyol or hydrogen donor of component 29 to form a color pigmented paste 31.

The addition of the preferred polyol of component 29 results in the extension reaction previously described. The products of this reaction are long chain polyols with urethane backbones, also referred to herein as urethane polyols.

Such urethane polyols are extended in molecular weight as a result of the reaction. The long chain urethane polyols have an excess of hydroxyl groups available for reaction with the second isocyanate prepolymer 13 in the step represented by FIG. 1 and described herein. The tertiary amine 23 catalyzes the extension reaction between the excess monomeric diisocyanate of component 27 and the preferred polyol of component 29. The tertiary amine 23 is a sufficient catalyst for these reactions, and no organometalic catalyst is required or desired.

The complete consumption of the monomeric diisocyanate of component 27 by the preferred polyol of component 29 can be confirmed with either an amine titration test or a centrifuged sample scanned on an infrared spectrophotometer well known in the art or by other means well known in the art. The polyurea component formed in the dehydration reaction remains in the color pigmented paste 31 following the above-described extension reaction.

Complete consumption of the monomeric diisocyanate of component 27 advantageously decreases or eliminates any potential toxicity of the color pigmented paste 31 and coating composition 10. The monomeric diisocyanate of component 27 is highly effective in eliminating water from the pigmented slurry 15 yet the calculated excess of the monomeric diisocyanate component 27 is toxic. The calculated excess of the monomeric diisocyanate of component 27 is used to advantage, however, to extend the low equivalent weight polyol of component 29 into long chain polyols with tough urethane backbones with a higher equivalent weight. The excess monomeric diisocyanate component 27 is consumed in the process reducing or eliminating any toxicity in the coating composition 10.

Figure 4:
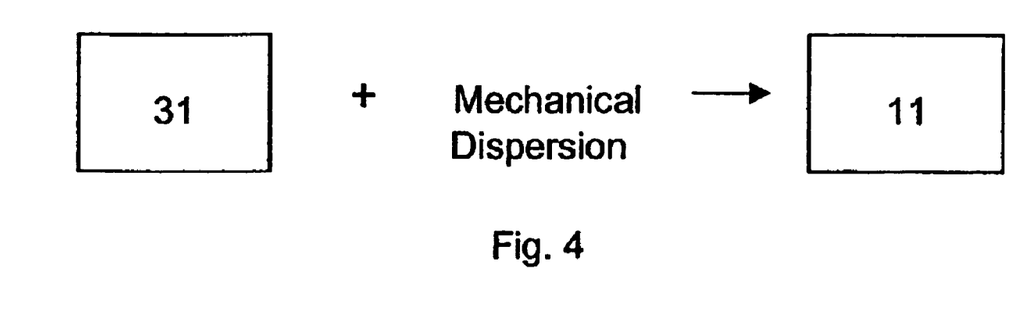
FIG. 4 illustrates, by means of a block diagram, a method for yielding a color pigmented dispersion in accordance with the present invention.

At this stage, the color pigmented paste 31 can be dispersed in any of the customary dispersion equipment well known in the art, resulting in the color pigmented dispersion 11. Typically, mechanical dispersion will be utilized to disperse paste 31 to form pigmented dispersion 11 as represented by FIG. 4. Caution must be exercised to prevent contamination of the pigmented dispersion 31 by atmospheric and other sources of moisture from this stage on.

Referring to FIG. 1, the pigmented dispersion 11 is then admixed with the isocyanate prepolymer 13 to yield the polyurethane coating composition 10. The pigmented dispersion 11 comprises from about 50–85 percent by weight of the coating composition 10 while the isocyanate prepolymer 13 comprises from about 50–15 percent by weight of the coating composition 10.

When the polyol is provided as component 29, the reaction represented by FIG. 1 comprises a reaction of the long chain polyol component cross linked to urethane molecules (i.e., the urethane polyols) present in the pigmented dispersion 11 with the second isocyanate prepolymer 13. The product of this reaction is the pigmented moisture-curing polyurethane coating 10 as represented by FIG. 1. The coating includes an excess of component 13 in order to provide a low viscosity and maintain flow of the composition.

A further solvent (not shown) may optionally be utilized in the reaction represented by FIG. 1 to enable a homogeneous mixture of the pigmented dispersion 11 with the isocyanate prepolymer 13. Any suitable solvent can be used.

The finished form coating composition 10 reacts with atmospheric moisture to cure and form a film on a surface to which coating 10 is applied. The combination of the polyurea, synthetic silica and the tertiary amine are thought to be responsible for the scattering of incident light by the cured film thereby resulting in the desired low levels of gloss and sheen.

Other optional constituents may be added to the coating composition 10 before application of the coating 10 to a surface. One such optional ingredient is a further catalyst 33 as represented in FIG. 1. The catalyst 33 is preferably a tertiary amine catalyst, such as the catalysts described above. The catalyst 33 is used to accelerate the rate at which the polyurethane coating 10 reacts with atmospheric moisture after application to the surface to be coated. By varying the amount of the catalyst 33 added to the polyurethane coating 10, the curing time may be tightly controlled.

The type and amount of the preferred polyol of component 29 chosen to react with the isocyanate component 27 in the pigmented slurry 15 to form the pigmented paste 31 is dictated by a number of factors. These factors include: (1) the nature of the second isocyanate prepolymer 13 selected for formation of the coating 10; and (2) the properties that are desired in the final form coating 10.

The properties of any moisture-curing coating composition, such as flexibility, hardness and chemical resistance, are greatly influenced by the functionality and equivalent weight of the isocyanate prepolymer 13 used in making the coating 10. Accordingly, control of the functionality and equivalent weight of the isocyanate prepolymer 13 permits the operator to formulate soft and flexible coatings or hard and tough coatings as required for a particular end use.

Functionality is defined as the number of functional isocyanate groups per molecule. Difunctional polyisocyanates (two isocyanate groups per molecule) generally produce (all else being equal) soft, flexible and rubbery coatings. Polyisocyanates having a functionality of more than two (more than two isocyanate groups per molecule) produce harder and tougher films.

Equivalent weight is the equivalent weight of the polyisocyanate, a factor which influences the properties of the final coating. Polyisocyanates having a high equivalent weight produce a less brittle coating than a low equivalent weight polyisocyanate. It is considered preferable to have an equivalent weight of 500 to 3000 for the urethane polyols formed by the reaction of the excess isocyanate component 27 and preferred polyol of component 29 when selecting the second isocyanate prepolymer 13. However, the end use properties such as flexibility, durability, chemical resistance, abrasion resistance, etc. dictate the preferable equivalent weight of the polyurethane coating 10.

The functionality and equivalent weight of the coating 10 can be controlled by properly choosing either the preferred polyol of component 29 or the isocyanate prepolymer 13. In other words, a low equivalent weight isocyanate prepolymer 13 can be converted to a high equivalent weight moisture-curing polyurethane by partially reacting it with a high equivalent weight difunctional polyol component 29, thus achieving increased flexibility. Also, if a difunctional polyisocyanate is provided for use as isocyanate prepolymer 13 it can be converted into a trifunctional moisture-curing polyurethane coating by choosing a trifunctional polyol for component 29 as its co-reactant, thus achieving increased toughness in the final coating 10.

The choice of the preferred polyol of component 29, monomeric diisocyanate of component 27, isocyanate prepolymer 13 and tertiary amine component 23 described herein and illustrated in the following examples represent some of the many combinations that can be used. For instance, if a difunctional polyisocyanate resin is selected for use as the isocyanate prepolymer 13, then slightly branched polyols can be used.

In addition to the highly controlled gloss and sheen properties of the invention, the coating composition 10 has additional advantages. These advantages include: (1) ease of incorporation of a wide range of pigments into the coating composition thereby improving aesthetics, durability, viscosity, corrosion resistance and ease of color matching; (2) reduced potential for toxicity made possible because the composition uses the lowest possible content of isocyanate monomers; (3) reduced cost and VOC emissions made possible because the composition may use low amounts of solvents or solvents, such as PCBFT, which are subject to VOC restrictions; (4) enhanced formulation latitude made possible because a variety of coating compositions can be made with the use of relatively few raw materials; (6) elimination of any requirement for metals catalysts to adjust the cure time of the coating composition; (7) the ability to use conventional high yield paint manufacturing equipment to manufacture the coating composition; and (7) enhanced control over the cure time of the applied coating allowing the cure time to be adjusted by the end user, such that each commercially produced batch of the coating may have multiple curing times.

As previously mentioned, latitude in formulation of the composition is important so that the formulation can use a minimum number of raw materials to obtain a broad range of moisture-curing polyurethanes with a matte finish. The present invention incorporates the ability to change the quantity of excess monomeric diisocyanate of component 27 used followed by a corresponding change in the quantity, equivalent weight and functionality of the polyol of component 29 used, allowing the quantity of tertiary amine 23 to be varied. The result is that the number and length of "bridges" between the molecules of polyisocyanate 13 are controllable making the composition 10 more or less flexible depending on the nature of change made in the quantity of the excess monomeric diisocyanate component 27 used and the corresponding changes in the preferred polyol of component 29. Formulating latitude is also enhanced by the tertiary amine catalyst 33 which allows for tight control over the curing time.

The color pigmented paste 31 of the invention offers several further benefits. These benefits include: (1) pigment dispersion is enhanced because the preferred urethane polyols act as a grinding vehicle for dispersion of the pigments; (2) pigment dispersion is further enhance because dehydration of the pigments facilitates their dispersion; (3) potential toxicity is further reduced because the preferred long chain urethane polyol reaction product will react faster with monomeric isocyanates than with polyisocyanates ensuring that the small quantity of monomeric isocyanates in the isocyanate prepolymer 13 will be partially consumed by the long chain polyol; and (4) the completed color pigmented dispersion 31 can be made in many basic colors and stored without adding the second isocyanate prepolymer 13. These various colors can be intermixed at a later date to achieve any desired shade of color. When the desired color has been reached, the required quantity of the chosen isocyanate prepolymer 13 and solvents (if any) can be mixed into a complete batch. This greatly simplifies the manufacture of different shades of paint products made with the coating composition 10.

EXAMPLES

The invention is further described in connection with the following, nonlimiting examples.

Base Formulation for Examples 1–8

A base formulation polyurethane moisture-curing coating composition was prepared for each of Examples 1–8. The exemplary coating was for a paint identified as "camouflage green #383." Camouflage green #383 is a paint intended for use in painting military vehicles. Each example comprises the base formulation and various matting agents provided to control light reflectance of the cured film. Observations regarding the matte finish appearance of the cured film are provided.

Base Formulation

A pigmented slurry was prepared as a first component of the base formulation. The constituents comprising the pigmented slurry, including an optional dispersing agent and thixotrope, are provided in Table 1.

A container equipped with a high speed dissolver and heating jacket was provided. The pigmented slurry components listed in Table 1, including pigments, solvent, tertiary amine catalyst and optional additives were placed in the container in the absolute and weight percent amounts (given as a weight percent of the total composition in Tables 1–3) listed in the last two columns of the table. The constituents were mixed at high speed to develop heat to about 150–160° F. to form the pigmented slurry.

The matting agent component (constituent number 8) identified in Table 1 was modified in each of the seven examples as indicated in Table 4. The catalyst used in each example (constituent number 9) is listed in Table 4. Commercial sources of each are listed in Table 1.

TABLE 1

Base Formulation Pigmented Slurry

| No. | Constituent/Source | Description | Amount (grams) | Wt. % Total |
|---|---|---|---|---|
| 1 | Methyl Amyl Ketone (Eastman Chemicals, Kingsport, TN) | solvent | 225.00 g | 22.5 |
| 2 | Disperbyk 167 (Byk Chemie USA, Hartford, CN) | dispersing agent | 20.00 g | 2.0 |
| 3 | Bentone 27 (Elementis Specialties, Corpus Christie, TX) | thixotrope | 5.00 g | .5 |
| 4 | Carbazole Violet (Bayer Corp., Pittsburgh, PA) | color pigment | 0.70 g | .07 |
| 5 | Mapico Tan 20 (Rockwood Pigments, Beltsville, MD) | color pigment | 16.00 g | 1.6 |

TABLE 1-continued

Base Formulation Pigmented Slurry

| No. | Constituent/Source | Description | Amount (grams) | Wt. % Total |
|---|---|---|---|---|
| 6 | Cobalt V-12600 (Ferro Corporation, Cleveland, OH) | color pigment | 52.00 g | 5.2 |
| 7 | Chromium Oxide G8599 (Elementis Pigments, Corpus Christie, TX) | color pigment | 78.00 g | 7.8 |
| 8 | Matting Agent Component as provided in Table 4 | matting pigment | 100–260 g | 10–26 |
| 9 | Catalyst Component as provided in Table 4 | catalyst | 0–1.8 g | 0–.18 |
| | TOTAL Pigmented Slurry | | 623.5 g | 62.35 |

Next, water in the pigmented slurry was eliminated in the dehydration reaction. Such water was present in the pigments. Following formation of the pigmented slurry, a small sample was drawn and tested for water concentration using the Karl Fischer method. Based on the results, 10.0% of a polyisocyanate component in the form of isophorone diisocyanate (IPDI) was added to completely react with and eliminate all water in the slurry. It was further determined that an additional 4.5% of IPDI should be added so as to produce useful urethane polyols when reacted with the polyol as described in the extension reaction described below. Table 2 lists the constituents added to the pigmented slurry in the dehydration and extension reaction steps including the absolute amount of each component and the weight percentage of each component to the total composition.

TABLE 2

Base Formulation Pigmented Dispersion With Isocyanate and Polyol Components

| No | Constituent/Source | Decription | Amount (grams) | Wt. % Total |
|---|---|---|---|---|
| *Dehydration Reaction* | | | | |
| 10 | Pigmented Slurry (Table 1) | * * * | 623.5 g | 62.35 |
| 11 | Isophorone diisocyanate (IPDL) (Huls America, Inc., Piscataway, N.J.) | dehydation reagent | 10.00 g | 1.0 |
| 12 | Isophorone diisocyanate (excess of amount required for dehydration reaction) | polyol extender | 4.50 g | .45 |
| *Extension Reaction* | | | | |
| 13 | Tone 0230 | Polyol (diol) | 56.00 g | 5.6 |
| | TOTAL Pigmented Dispersion | | 694.0 g | 69.4 |

As set forth in Table 4, if a catalyst was present, the catalyst accelerated the rate of the dehydration and extension reactions. The catalyst of the examples consisted of either the tertiary amine catalyst Desmorapid PP™ (Bayer Corp., Pittsburgh, Pa.) or Dabco T-12 organometalic tin catalyst (Air Products, Inc. Allentown, Pa.). The agitation was continued for 60 minutes and a fresh sample was tested as before for water content. The concentration of water was found to be less than 0.01%. At this stage, the temperature of the slurry was found to be between 170–180° F.

Satisfactory dehydration having been achieved, 5.6 percent by weight of the total composition (including all optional additives) of Tone 0230 polyol™ (Union Carbide Corp., Charleston, W. Va.), a polycaprolactone was added to the slurry and the agitation continued. After approximately 60 minutes, a small sample was withdrawn and centrifuged to separate the resin (Tone 0230/IPDI extended urethane polyol) from the pigments. The supernatant layer was analyzed for the presence of isocyanate in an infrared spectrophotometer (Perkin-Elmer, Model 1430, Norwalk, Conn.). A characteristic small band was detected at approximately the 2775 $cm^{-1}$ wavelength indicating the presence of un-reacted IPDI in the slurry. The mixing of the slurry was continued for an additional hour and the slurry was re-checked for the presence of IPDI. There was none. Consumption of the IPDI indicated completion of the extension reaction process and formation of the extended polyol urethanes.

The product of the preceding reactions is a pigmented paste. The pigmented paste including the extended urethane polyols was mechanically agitated by running the paste through a sand mill to eliminate all pigment agglomerates. This is a common practice in the coating industry. The product of the agitation was a pigmented dispersion.

As indicated in Table 3, the sand milled pigmented dispersion was then combined with an isocyanate component in the form of 21.0 weight percent of the polyisocyanate polymer Talonate HDT-LV™. The pigmented dispersion and second isocyanate were agitated under a nitrogen blanket for 15 minutes. Methyl amyl ketone and 0.1% Byk 300™ were added in the amounts indicated in Table 3 to yield the finished form polyurethane coating composition in the form of a paint. Table 3 identifies the absolute and weight percentage amounts of the remaining base formulation constituents added to the coating composition. The formulated polyurethane paint was homogenized and packaged.

TABLE 3

Base Formulation Pigmented Dispersion Slurry With Isocyanate Prepolymer and Optional Components

| No | Constituent/Source | Decription | Amount (grams) | Wt. % Total |
|---|---|---|---|---|
| 14 | Pigmented Dispersion (Table 2) | * * * | 694.0 g | 69.4 |
| 15 | Talonate HDT-LV (Rhodia, Inc., Cranbury, NJ) | isocyanate prepolymer | 210.00 g | 21.0 |
| 16 | Byk-300 | flow agent | 1.00 g | .1 |
| 17 | Methyl Amyl Ketone | solvent | 95.00 g | 9.5 |
| | TOTAL | | 1000.00 g | 100 |

Examples 1–8

Eight polyurethane coating compositions were produced in accordance with the base formulation described above.

Each of the eight exemplary compositions included the matting agent and catalyst components listed in Table 4. Examples 1–3, 5 and 7 are outside the scope of the invention and are provided to demonstrate the improvement provided by Examples 4, 6 and 8 which are compositions according to the invention. Each specimen coating was applied to a flat surface made of lacquer-coated paper and permitted to cure for twenty four hours at 75° F. and 30% relative humidity resulting in the finished form, fully cured film.

Measurements were taken of the gloss and sheen of each of the cured films of Examples 1–8. The measurements were taken using a Byk Instruments glossmeter (Byk Instruments, Norwalk, Conn.). The measurement of film gloss was taken at an angle of 60° to the coated surface and the measurement of sheen was taken at an angle of 85° to the coated surface. The gloss and sheen measurements are provided in Table 4.

TABLE 4

Examples 1–8 Base Formulation with Selected Matting Agent and Catalyst Components

| Ex. | Matting Agent Component/ amount (grams) | Catalyst Component/ amount (grams) | Gloss | Sheen |
| --- | --- | --- | --- | --- |
| 1 | Celite 499/200 g | Dabco T-12/1.8 g | 0.8 | 2.5 |
| 2 | Mica CD-2200/260 g | Dabco T-12/1.8 g | 1.4 | 3.3 |
| 3 | GASIL HP-39/100 g | Dabco T-12/1.8 g | 7.7 | 12.8 |
| 4 | GASIL HP-39/100 g | Desmorapid PP/1.8 g | 0.6 | 1.9 |
| 5 | Mica CD-2200/130 g and GASIL HP-39/50 g | Dabco T-12/1.8 g | 1.4 | 3.8 |
| 6 | Mica CD-2200/130 g and GASIL HP-39/50 g | Desmorapid PP/1.8 g | 0.8 | 26 |
| 7 | Mica CD-2200/130 g and GASIL HP-39/50 g | None | 1.5 | 4.5 |
| 8 | Mica CD-2200/130 g and GASIL HP-39/50 g | Desmorapid PP/1.8 g | 0.8 | 2.4 |

Example 1

Example 1 is a polyurethane composition made in accordance with the base formulation. As indicated in Table 4, the matting agent consisted of 200 grams of Celite 499 crystalline silica. The Dabco T-12/1.8 g catalyst was a conventional dibutyl tin dilaurate organometallic catalyst. The composition of Example 1 had gloss and sheen values, respectively, of 0.8 and 2.5 which are within the values of 1 (gloss) and 3.5 (sheen) permitted by U.S. Military standard MIL-C-53039. The low gloss and sheen values are believed to result from the Celite 499 which is known to be a highly efficacious matting agent. The light-scattering effect of the Celite 499 is sufficient to counteract any gloss and sheen resulting from use of the organometallic catalyst. However, crystalline silica is expected to be phased out as a matting agent suitable for use in compliance with MIL-C-53039 and MIL-C-46168. A substitute is required.

Example 2

Example 2 is a further polyurethane composition made in accordance with the base formulation. Example 2 includes a matting agent component comprising mica together with the organometalic catalyst of Example 1. The mica was present in an amount of 115% the crystalline silica used in Example 1. As listed in Table 4, the gloss and sheen values of 1.4 and 3.3 were unacceptably higher than those of Example 1. The gloss value is outside the range permitted by U.S. Military standard MIL-C-53039 and MIL-C-46168. A matting agent component consisting solely of mica with a metal catalyst is not compliant with MIL-C-53039 or MIL-C-46168.

Example 3

Example 3 is a polyurethane composition identical to Example 2 except that 100 grams of a synthetic silica matting agent (GASIL-HP39) was provided in place of the mica matting agent. It was determined that 100 grams of the synthetic silica was the maximum amount of matting agent which could be incorporated into the composition without exceeding the CPVC resulting in loss of composition film properties.

The gloss value of 7.7 and sheen value of 12.8 are far outside the range permitted by MIL-C-53039 and MIL-C-46168. These values could not be reduced further by addition of more synthetic silica without exceeding the CPVC.

Example 4

Example 4 is a polyurethane composition identical to Example 3 except that 1.8 grams of a catalyst component consisting of a tertiary amine (Desmorapid PP) was provided in place of the organometallic catalyst. The data demonstrate that synthetic silica, in combination with the polyurea and tertiary amine, produce a film having gloss and sheen values well within those permitted by MIL-C-53039 and MIL-C-46168 and are achieved without crystalline silica. The data show a surprising and unexpected material reduction in gloss and sheen to values of 0.6 and 1.9 respectively. The composition of Example 4 represents a coating material highly efficacious as a military paint or camouflage coating.

Example 5

Example 5 is a polyurethane composition made according to the base formulation except that the matting agent component comprises both mica and synthetic silica. Dabco T-12 organometallic catalyst was provided as the catalyst. The data show that the gloss and sheen values were approximately the same as the values for Example 2 which included a matting agent consisting of only mica. The composition of Example 4 is not compliant with MIL-C-53039 and MIL-C-46168.

Example 6

Example 6 is a further polyurethane composition made according to the base formulation. The matting agent component comprises both mica and synthetic silica. Example 6 differs from Examples 1–3 and 5 in that a tertiary amine catalyst is provided as a catalyst in place of dibutyl tin dilaurate organometallic catalyst.

The data again show a surprising and unexpected material reduction in gloss and sheen, in this example to values of 0.8 and 2.6 respectively. These values are well within MIL-C-53039 and MIL-C-46168 and demonstrate that a mica matting agent can be used with the synthetic silica as a "filler" to achieve the desired levels of gloss and sheen.

Example 7

Example 7 was prepared as a control to evaluate the effect of the tertiary amine catalyst of Example 6. The polyurethane coating composition of Example 7 was prepared exactly as the formulation of Example 6 except that no catalyst was supplied. The dehydration and polyol extension reactions both took an inordinately long period of time without the presence of the tertiary amine catalyst. Further, the data show a material increase in the gloss and sheen to values outside MIL-C-53039 and MIL-C-46168 when no tertiary amine catalyst is present.

Example 8

Example 8 was prepared as a control with respect to the compositions of Examples 6–7 and to further evaluate the effect of the tertiary amine catalyst on the gloss and sheen values of the cured film. Example 8 is a further polyurethane composition made according to the base formulation and having the same constituents as Example 6. The matting agent component once again comprised both mica and synthetic silica and a tertiary amine catalyst was provided.

Consistent with Example 6, the data demonstrate that the cured film has highly controlled light reflectance properties with gloss and sheen to values of 0.8 and 2.4 respectively. Mica can be provided as a "filler" without adversely affecting the controlled gloss and sheen values. These values are well within MIL-C-53039 and MIL-C-46168 and demonstrate that the composition of the invention is a substitute for existing polyurethane paints which include undesirable crystalline silica.

By way of possible explanation for this advantageous result, it is believed that the polyurea and matting agent component reacted in the presence of the tertiary amine catalyst cooperate to produce a cured film which is highly effective in scattering light from the surface of the cured film, thereby achieving the highly desired controlled gloss and sheen properties compliant with MIL-C-53039 and MIL-C-46168. Compliance with these military standards ensures that the paint is acceptable not only for use in military applications but also in all other applications where highly controlled light reflectance is sought. Synthetic silica may be used as the matting agent component or other fillers, such as mica, may be used in combination with the synthetic silica.

It is believed that the invention has been described in such detail as to enable those skilled in the art to understand the same and it will be appreciated that variations may be made without departing from the spirit and scope of the invention.

In the claims which follow, all percentages given, including percentages recited with subconstituents of particular constituents, are weight percentages by weight of the total composition.

What is claimed is:

1. A pigmented moisture-curing coating composition which, upon curing, forms a film having a matte finish comprising:
   about 50–85 percent of a pigmented dispersion comprising:
      about 47–60 percent of a pigmented slurry comprising an admixture of:
         about 10–40 percent of a solvent;
         about 10–40 percent of a water-containing pigment; and
         about 3–20 percent of synthetic silica; and
      about 0.1–2.0 percent of a tertiary amine catalyst;
      about 0.5–3.0 percent of a polyisocyanate admixed with the pigmented slurry and tertiary amine catalyst, said polyisocyanate being present in excess of an amount sufficient to essentially dehydrate the pigmented slurry; and
      about 2.0–20 percent of an organic polyol admixed with the pigmented slurry, polyisocyanate and tertiary amine to yield a pigmented paste including a urethane polyol reaction product having hydroxyl groups, said polyol being present in an amount sufficient to react with substantially all of the polyisocyanate, said pigmented paste forming a pigmented dispersion upon dispersion; and
   about 15–50 percent of an isocyanate prepolymer admixed with the pigmented dispersion, said isocyanate prepolymer being present in excess of an amount sufficient to react with all of the hydroxyl groups.

2. The composition of claim 1 wherein the synthetic silica comprises an amorphous silica.

3. The composition of claim 2 wherein the amorphous silica is made according to a "sol gel" process and has a maximum particle size diameter of about 100μ.

4. The composition of claim 1 wherein the tertiary amine catalyst is selected from the group consisting of triethyl amine, N,N,N',N',N"-pentamethyldiethylene-triamine, and N,N,N',N'-tetramethyl-1,3-propanediamine and mixtures thereof.

5. The composition of claim 1 wherein the dispersing solvent is selected from the group consisting of parachlorobenzotrifluoride, methyl amyl ketone, methyl acetate, esters, aromatic hydrocarbons and mixtures thereof.

6. The composition of claim 1 wherein the pigmented slurry further comprises about 5–50 percent of a filler selected from the group consisting of mica, talc, calcium carbonate, clays and mixtures thereof.

7. The composition of claim 6 wherein the mica comprises wet-ground mica having a maximum particle size diameter of about 100μ.

8. The composition of claim 1 wherein the pigmented slurry further comprises about 0.2–5.0 percent of a dispersing agent selected from the group consisting of cationic, anionic and nonionic dispersing agents and mixtures thereof.

9. The composition of claim 1 wherein the pigmented slurry further includes about 0.2–5.0 percent of a thixotrope selected from the group consisting of modified bentonites, fumed silicas, modified polyethylene, polyamides and mixtures thereof.

10. The composition of claim 1 wherein the polyisocyanate is an aliphatic diisocyantate.

11. The composition of claim 10 wherein the aliphatic diisocyantate is selected from the group consisting of isophorone diisocyanate, trimethyl hexamethylene diisocyanate, toluene diisocyanate and diphenyl methane diisocyanate.

12. The composition of claim 1 wherein the organic polyol is selected from the group consisting of polycaprolactone polyols, polyols, polytetramethylene ether glycols, polypropylene glycols, polyester diols, alkylene diols, 1,4 cyclohexane dimethanol and polycarbonates having terminal hydroxyl groups and having an average functionality of less than 2.3.

13. The composition of claim 1 wherein the isocyanate prepolymer comprises an organic isocyanate selected from the group consisting of a biuret of hexamethylene diisocyanate, dimers, trimers and oligomers of hexamethylene diisocyanate, isophorone diisocyanate, trimethyl hexamethylene diisocyanate, toluene diisocyanate and diphenyl methane diisocyanate.

14. The composition of claim 1 further including less than about 3.0 percent of a tertiary amine catalyst added to the finished form coating composition to adjust the rate at which the coating cures to form the film, said catalyst being selected from the group consisting of triethyl amine, N,N,N',N',N"-pentamethyldiethylene-triamine, and N,N,N',N'-tetramethyl-1,3-propanediamine and mixtures thereof.

15. The composition of claim 1 wherein the cured film has a gloss taken at an angle of 60° of less than about 1.

16. The composition of claim 15 wherein the cured film has a sheen taken at an angle of 85° of less than about 3.5.

17. A method of making a pigmented moisture-curing coating composition which, upon curing, forms a film having a matte finish comprising the steps of:

preparing a pigmented slurry by admixing:
about 10–40 percent of at least one solvent;
about 10–40 percent of at least one water-containing pigment; and
about 3–20 percent of synthetic silica;
admixing with the pigmented slurry about 0.05–3.0 percent of at least one tertiary amine catalyst;
admixing about 0.5–3.0 percent of a polyisocyanate with the pigmented slurry and tertiary amine catalyst, said polyisocyanate being present in excess of an amount sufficient to essentially dehydrate the pigmented slurry;
admixing about 2.0–20 percent of an organic polyol with the pigmented slurry, polyisocyanate and tertiary amine catalyst to form a pigmented paste including a urethane polyol reaction product having hydroxyl groups, said polyol being present in an amount sufficient to react with all of the polyisocyanate;
dispersing the pigmented paste to form a pigmented dispersion; and
admixing about 15–50 percent of an isocyanate prepolymer with about 50–85 percent of the pigmented dispersion to form the coating composition, said isocyanate prepolymer being present in excess of an amount sufficient to react with all of the hydroxyl groups.

18. The method of claim 17 wherein the synthetic silica comprises an amorphous silica made according to the "sol gel" process and having a maximum particle size diameter of about 100μ.

19. The method of claim 17 wherein the tertiary amine catalyst is selected from the group consisting of triethyl amine, N,N,N',N',N"-pentamethyldiethylenetriamine, and N,N,N',N'-tetramethyl-1,3-propanediamine and mixtures thereof.

20. The method of claim 17 further including the step of admixing about 5–50 percent of a filler with the pigmented slurry, said filler being selected from the group consisting of mica, talc, calcium carbonate, clays and mixtures thereof.

21. The method of claim 20 wherein the mica comprises wet-ground mica having a maximum particle size diameter of about 100μ.

22. The method of claim 17 wherein the solvent is selected from the group consisting of parachlorobenzotrifluoride, methyl amyl ketone, methyl acetate, esters, aromatic hydrocarbons and mixtures thereof.

23. The method of claim 17 wherein the polyisocyanate comprises an aliphatic diisocyantate.

24. The method of claim 17 wherein the aliphatic diisocyantate is selected from the group consisting of isophorone diisocyanate, trimethyl hexamethylene diisocyanate, toluene diisocyanate and diphenyl methane diisocyanate.

25. The method of claim 17 wherein the organic polyol is selected from the group consisting of polycaprolactone polyols, polytetramethylene ether glycols, polypropylene glycols, polyester diols, alkylene diols, 1,4 cyclohexane dimethanol and polycarbonates having terminal hydroxyl groups and having an average functionality of less than 2.3.

26. The method of claim 17 wherein the isocyanate prepolymer comprises an organic isocyanate selected from the group consisting of a biuret of hexamethylene diisocyanate, dimers, trimers and oligomers of hexamethylene diisocyanate, isophorone diisocyanate, trimethyl hexamethylene diisocyanate, toluene diisocyanate and diphenyl methane diisocyanate.

27. The method of claim 17 further including, before the dispersing step, the step of admixing about 0.2–5.0 percent of a dispersing agent with the composition, said dispersing agent being selected from the group consisting of cationic, anionic and nonionic dispersing agents and mixtures thereof.

28. The method of claim 17 further including, before the dispersing step, the step of admixing about 0.2–5.0 percent of a thixotrope with the composition, said thixotrope being selected from the group consisting of modified bentonites, fumed silicas, modified polyethylene, polyamides and mixtures thereof.

29. The method of claim 17 further including, after the step of admixing the isocyanate prepolymer with the pigmented dispersion and before application of the moisture-curing coating to a surface to be coated, the further step of admixing less than about 3.0 percent of a tertiary amine catalyst with the composition, said catalyst being selected from the group consisting of triethyl amine, N,N,N',N',N"-pentamethyldiethylene-triamine, and N,N,N',N'-tetramethyl-1,3-propanediamine and mixtures thereof.

30. The method of claim 17 wherein the cured film has a gloss taken at an angle of 60° of less than about 1.

31. The method of claim 30 wherein the cured film has a sheen taken at an angle of 85° of less than about 3.5.

* * * * *

UNITED STATES PATENT AND TRADEMARK OFFICE
CERTIFICATE OF CORRECTION

PATENT NO. : 6,878,771 B2
DATED : April 12, 2005
INVENTOR(S) : Bhaskar R. Urs

It is certified that error appears in the above-identified patent and that said Letters Patent is hereby corrected as shown below:

Column 3,
Line 22, delete "an";

Column 13,
Line 14, delete "6" and insert -- 5 --;
Line 16, delete "7" and insert -- 6 --;
Line 45, delete "enhance" and insert -- enhanced --;

Column 14,
Line 39, delete "and weight percent";
Lines 39-40, delete "(given as a weight percent of the total composition in Tables 1-3)";
Line 40, delete "two";
Line 40, delete "columns" and insert -- column --;
Line 45, delete "seven" and insert -- eight --;

Columns 14 and 15,
Delete TABLE 1 and insert the following TABLE 1 therefor;

Table 1

Base Formulation Pigmented Slurry

| No. | Constituent/Source | Description | Amount (grams) |
|---|---|---|---|
| 1 | Methyl Amyl Ketone (Eastman Chemicals, Kingsport, TN) | solvent | 225.00g |
| 2 | Disperbyk 167 (Byk Chemie USA, Hartford, CN) | dispersing agent | 20.00g |
| 3 | Bentone 27 (Elementis Specialties, Corpus Christie, TX) | thixotrope | 5.00g |
| 4 | Carbazole Violet (Bayer Corp., Pittsburgh, PA) | color pigment | 0.70g |
| 5 | Mapico Tan 20 (Rockwood Pigments, Beltsville, MD) | color pigment | 16.00g |
| 6 | Cobalt V-12600 (Ferro Corporation, Cleveland, OH) | color pigment | 52.00g |
| 7 | Chromium Oxide G8599 (Elementis Pigments, Corpus Christie, TX) | color pigment | 78.00g |
| 8 | Matting Agent Component as provided in Table 4 | matting agent | 100-260g |
| 9 | Catalyst Component as provided in Table 4 | catalyst | 0-1.8g |
|  | TOTAL Pigmented Slurry |  | 496.7g - 658.5g |

UNITED STATES PATENT AND TRADEMARK OFFICE
CERTIFICATE OF CORRECTION

PATENT NO. : 6,878,771 B2
DATED : April 12, 2005
INVENTOR(S) : Bhaskar R. Urs

It is certified that error appears in the above-identified patent and that said Letters Patent is hereby corrected as shown below:

Column 15,
Line 23, delete "10.0%" and insert -- 10.0 grams --;
Line 27, delete "4.5.%" and insert -- 4.5 grams --;
Lines 32-34, delete "and the weight percentage of each component to the total composition";
Delete TABLE 2 and insert the following TABLE 2 therefor;

Table 2
Base Formulation Pigmented Dispersion With
Isocyanate and Polyol Components

| No. | Constituent/Source | Description | Amount (grams) |
|---|---|---|---|
| Dehydration Reaction | | | |
| 10 | Pigmented Slurry (Table 1) | * * * | 496.7g - 658.5g |
| 11 | Isophorone diisocyanate (IPDI) (Huls America, Inc., Piscataway, N.J.) | dehydation reagent | 10.00g |
| 12 | Isophorone diisocyanate (excess of amount required for dehydration reaction) | polyol extender | 4.50g |
| Extension Reaction | | | |
| 13 | Tone 0230 | Polyol (diol) | 56.00g |
| | TOTAL Pigmented Dispersion | | 567.2g - 729g |

Lines 64-65, delete "5.6 percent by weight" and insert -- 56.00 grams --;

Column 16,
Line 39, delete "21.0 weight percent" and insert -- 210.00 grams --;
Line 42, delete "0.1%";
Lines 45-46, delete "and weight percentage";
Delete TABLE 3 and insert the following TABLE 3 therefor;

Table 3
Base Formulation Pigmented Dispersion Slurry With
Isocyanate Prepolymer and Optional Components

| No. | Constituent/Source | Description | Amount (grams) |
|---|---|---|---|
| 14 | Pigmented Dispersion (Table 2) | * * * | 567.2g - 729g |
| 15 | Talonate HDT-LV (Rhodia, Inc., Cranbury, NJ) | isocyanate prepolymer | 210.00g |
| 16 | Byk-300 | flow agent | 1.00g |
| 17 | Methyl Amyl Ketone | solvent | 95.00g |
| | TOTAL | | 873.2g - 1035g |

UNITED STATES PATENT AND TRADEMARK OFFICE
CERTIFICATE OF CORRECTION

PATENT NO. : 6,878,771 B2
DATED : April 12, 2005
INVENTOR(S) : Bhaskar R. Urs

It is certified that error appears in the above-identified patent and that said Letters Patent is hereby corrected as shown below:

Column 17,
Table 4, Line 30 (column titled "Sheen", row titled "Example 6") delete "26" and insert -- 2.6 --;

Column 19,
Lines 46, 48, 50, 51, 53, 54, 55 and 60, after each occurrence of "percent" insert -- by weight --;

Column 20,
Line 1, after "percent" insert -- by weight --;
Line 20, after "percent" insert -- by weight --;
Line 27, after "percent" insert -- by weight --;
Line 31, after "percent" insert -- by weight --;
Line 57, after "percent" insert -- by weight --;

Column 21,
Lines 2, 3, 5, 7, 8, 9, 20 and 21, after each occurrence of "percent" insert -- by weight --;
Line 8, delete "0.5" and insert -- 0.1 --;
Line 35, after "percent" insert -- by weight --;

Column 22,
Line 21, after "percent" insert -- by weight --;
Line 26, after "percent" insert -- by weight --;

UNITED STATES PATENT AND TRADEMARK OFFICE
CERTIFICATE OF CORRECTION

PATENT NO. : 6,878,771 B2
DATED : April 12, 2005
INVENTOR(S) : Bhaskar R. Urs

It is certified that error appears in the above-identified patent and that said Letters Patent is hereby corrected as shown below:

<u>Column 22 (cont'd),</u>
Line 43, insert the following claims 32 through 39:

--32. The composition of claim 1 wherein the tertiary amine catalyst is present in an amount of about 0.1-0.21 percent by weight of the composition.

33. The composition of claim 32 wherein the tertiary amine catalyst is present in an amount of between about 0.19-0.21 percent by weight of the composition.

34. The composition of claim 1 wherein the synthetic silica is present in an amount of about 3-11 percent by weight of the composition.

35. The composition of claim 34 wherein the synthetic silica is present in an amount of between about 5-11 percent by weight of the composition.

36. The method of claim 17 wherein the tertiary amine catalyst is present in an amount of about 0.1-0.21 percent by weight of the composition.

37. The method of claim 36 wherein the tertiary amine catalyst is present in an amount of between about 0.19-0.21 percent by weight of the composition.

38. The method of claim 17 wherein the synthetic silica is present in an amount of about 3-11 percent by weight of the composition.

39. The method of claim 38 wherein the synthetic silica is present in an amount of between about 5-11 percent by weight of the composition.--

Signed and Sealed this

Twentieth Day of December, 2005

JON W. DUDAS
*Director of the United States Patent and Trademark Office*